United States Patent [19]
Abe et al.

[11] Patent Number: 5,575,851
[45] Date of Patent: Nov. 19, 1996

[54] DIE COATER

[75] Inventors: Tetsuo Abe, Mizumaki-machi; Hitoshi Hatashima, Kitakyushu; Kunihiko Ichikawa, Machida; Takefumi Yoshikawa, Kodaira, all of Japan

[73] Assignee: Mitsubishi Chemical Corporation, Tokyo, Japan

[21] Appl. No.: 141,638

[22] Filed: Oct. 27, 1993

[30] Foreign Application Priority Data

Oct. 27, 1992 [JP] Japan .................................. 4-288816
Nov. 16, 1992 [JP] Japan .................................. 4-305573

[51] Int. Cl.⁶ .................................................. B05C 3/18
[52] U.S. Cl. ........................................ 118/410; 118/419
[58] Field of Search ............................... 425/466, 382.4, 425/461, 467; 118/419, 410, 411

[56] References Cited

U.S. PATENT DOCUMENTS

| | | | |
|---|---|---|---|
| 3,018,515 | 1/1962 | Sneddon | 425/466 |
| 3,133,313 | 5/1964 | Corbett | 425/466 |
| 3,694,132 | 9/1972 | Bunte et al. | 425/466 |
| 3,706,518 | 12/1972 | Bunte et al. | 425/466 |
| 3,711,235 | 1/1973 | Bunte et al. | 425/466 |
| 3,829,274 | 8/1974 | Melead | 425/466 |
| 3,832,120 | 8/1974 | Shaffer . | |

FOREIGN PATENT DOCUMENTS

| | | |
|---|---|---|
| 1503511 | 3/1978 | United Kingdom . |
| 2092512 | 8/1982 | United Kingdom . |

*Primary Examiner*—Brenda A. Lamb
*Attorney, Agent, or Firm*—Oblon, Spivak, McClelland, Maier & Neustadt, P.C.

[57] ABSTRACT

Disclosed herein is a die coater comprising a die composed of upper and lower mold-pieces which form a manifold and a slit extending from the manifold, an inner deckle shaft disposed in the manifold, a deckle disposed in the slit in a fluid-tight state, and a deckle guide; the inner deckle shaft having a fluid-tight portion near an end thereof and capable of moving with its fluid-tight state kept, the deckle and the deckle guide being secured to the inner deckle shaft, and the deckle being connected with the fluid-tight portion of the inner deckle shaft.

8 Claims, 8 Drawing Sheets

DIE COATER

BACKGROUND OF THE INVENTION

The present invention relates to a die coater. More specifically, it relates to a die coater improved so as to easily change a coating width without disassembling a die. Further, it relates to the improved die coater capable of changing coating fluid rapidly.

A die coater has been used conventionally as a device for coating the surface of a sheet under running. The die coater is a coating device comprising a die in which upper and lower mold-pieces form a manifold and a slit extending therefrom, and deckles are usually disposed rightwards and leftwards in the slit respectively in a fluid-tight state. The deckle is used for closing the slit and, when the coating width is changed or the coating fluid is changed by moving the deckle to a predetermined position, it is necessary to detach the die from the die coater and disassemble the detached die.

In addition, since the die coater has a number of assembling bolts, it requires a long time for detaching of the die and disassembling or reassembling operation. Further, a straightness has to be ensured after reassembling the die. Therefore, the operation is much time- and labor-consuming and enforces considerable burden on operators also in view of poor operation circumstance.

The present inventors have made an earnest study in view of the foregoing problems and, as a result, have found that a distance between deckles in a slit can be changed by disposing inner deckle shaft having a fluid-tight portion near an end thereof is disposed in a manifold, the deckle and a deckle guide of a specific structure being secured the inner deckle shaft. The present invention has been accomplished based on the finding.

SUMMARY OF THE INVENTION

In an aspect of the present invention, there is provided a die coater comprising a die composed of upper and lower mold-pieces which form a manifold and a slit extending from the manifold, an inner deckle shaft disposed in the manifold, a deckle disposed in the slit in a fluid-tight state, and a deckle guide; the inner deckle shaft having a fluid-tight portion near an end thereof and capable of moving with its fluid-tight state kept, the deckle and the deckle guide being secured to the inner deckle shaft, and the deckle being connected with the fluid-tight portion of the inner deckle shaft.

2

DETAILED DESCRIPTION OF THE INVENTION

In a die coater according to the present invention, when an inner deckle shaft is moved with a fluid-tight state kept, for example, by a driving mechanism, a deckle and a deckle guide secured to the inner deckle shaft are moved integrally and a coating width can be changed (change of width can be made) without breaking the fluid-tight state. In particular, in the case of disposing the deckle guide on both sides of the deckle, since the deckle is firmly secured to the inner deckle shaft by the deckle guide, the deckle hardly detaches even by repeating operation. Further, when the inner deckle shaft is a hollow article, a coating fluid supply channel is the inside thereof, and a flow channel closing member capable of moving along the manifold is disposed in the inside, since the supply port for the coating fluid can be changed, the coating fluid can be changed (for example, color change).

A preferred embodiment of the present invention is described with reference to the accompanying drawings.

Figure 1:
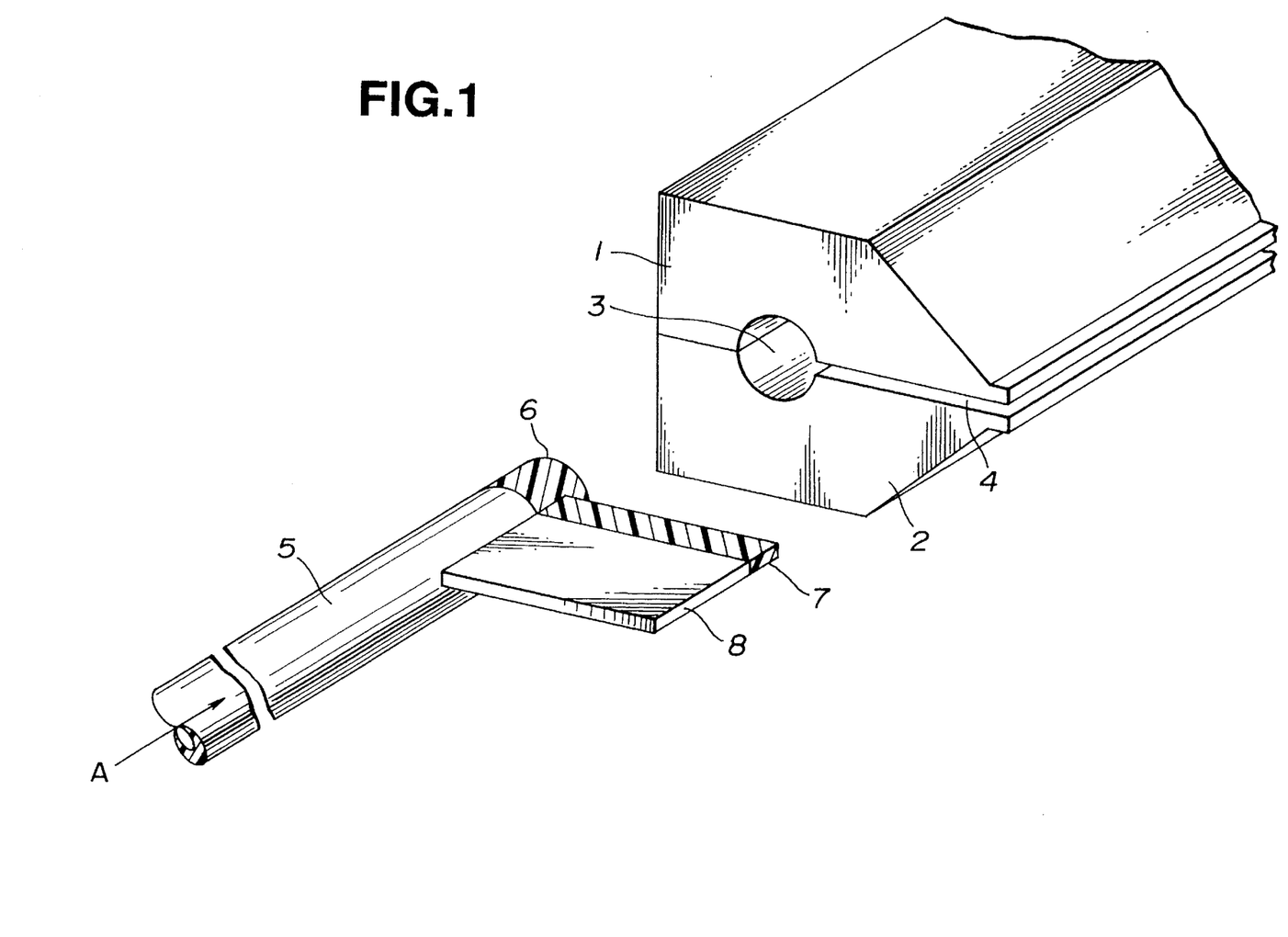
FIG. 1 is an explanatory partial view (perspective view) showing an embodiment of a die coater.

FIG. 1 is an explanatory partial view showing an embodiment of a die coater according to the present invention. The die coater according to the present invention has basically the same structure as that of a conventional die coater, in which upper and lower mold-pieces 1 and 2 form a manifold 3 and a slit 4. An inner deckle shaft 5 having a fluid-tight portion 6 near the end thereof is disposed in the manifold (FIG. 1). The slit 4 means the entire thin plate-like space. The thickness of the slit 4 may vary depending on viscosity of the coating fluid. In the case of usual coating fluid or paint, the thickness is generally about 50 to 1000 μm, preferably 50 to 500 μm. In the case of high-viscous fluid, the thickness may be enlarged, for example, up to about 5 mm. A deckle 7 disposed in the slit in a fluid-tight state and a deckle guide 8 for supporting the same are secured to the inner deckle shaft.

The inner deckle shaft usually has a circular cross section which may be solid or hollow. In case where the inner deckle shaft is a hollow article, the inside thereof can be used as a coating fluid supply channel (coating fluid is supplied in the direction of an arrow A in FIG. 1). In case where the deckle shaft is a hollow article but the inside is not used as the coating fluid supply channel, it is necessary to close the end of the inner deckle shaft. The coating fluid can be supplied to the manifold, by using the inner deckle shaft as described above, as well as by disposing a channel in communication with a manifold to the upper portion or the rear portion (the side opposite to the slit) of the upper mold-piece 1.

It is necessary that the inner deckle shaft has a fluid-tight portion of a fluid-tight structure near the top end.

The fluid-tight structure means a sealing structure which prevents leakage of fluid. Any of fluid-tight structures usually used for a sliding portion in a cylinder such as O-ring or gland packing can be used. The deckle 7 for making the slit fluid-tight may be made of any material having corrosion resistance to the coating fluid or cleaning fluid used in the die coater and having an elasticity capable of maintaining the fluid-tight state in the slit gap sufficiently. For instance, fluoro resin (fluorine-containing resin), polyamide or polyester is preferred for the material. The material preferably has a thickness greater by 10 to 50 μm than that of the slit gap and is inserted under compression into the slit, thereby forming a fluid tight state. The width of the deckle in the longer direction of the slit is preferably narrow, for example, 1 to 50 mm in order to prevent fluid leakage caused by uneven contact of the fluid-tightening surface or to reduce the frictional resistance upon change of the coating width.

The deckle guide 8 secured to the inner deckle shaft is a support member for moving the deckle 7 smoothly in accordance with the movement of the inner deckle shaft upon change of the coating width and it is necessary that the guide is fixed to the deckle 7. It can be fixed by any of means such as bonding by adhesives, fitting structure by a dovetail. Alternatively, it can be used a method of using a plate member thinner than the deckle as a deckle guide 8 and lining a portion of the deckle guide 8 with a resin or the like to form a deckle 7 or a method of scraping off a portion of a thick plate member of the deckle 7 to form a deckle guide 8. Since the deckle guide 8 is not intended for making the fluid-tight state in the slit, the thickness of the deckle guide 8 is made smaller, for example, by 10 to 100 μm than the slit gap so that it does not cause resistance upon movement along the manifold.

In the thus constituted die coater, when the inner deckle shafts 5 are moved along the manifold by, for example, using a driving device (not shown), the coating width can be changed continuously while keeping the fluid-tight state.

Figure 2:
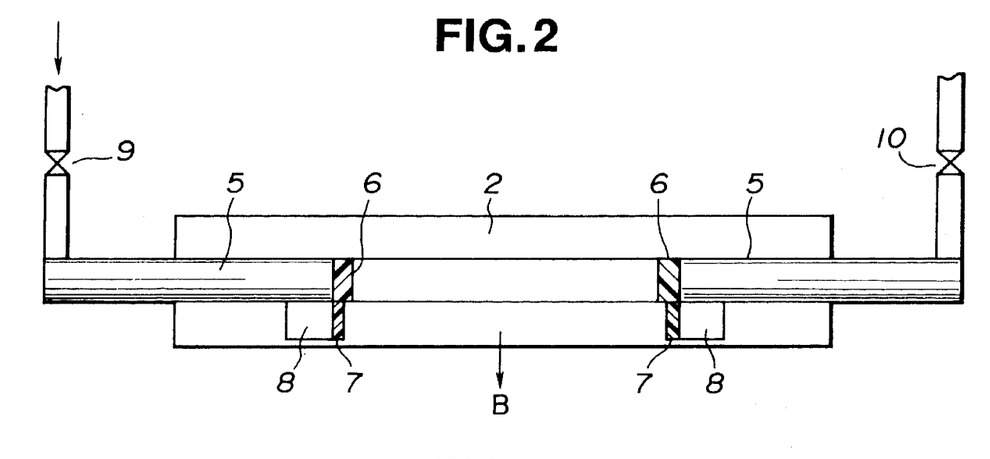
FIG. 2 is a view showing an example of coating operation.

FIG. 2 is a view showing an example of coating operation by the die coater according to the present invention (the upper mold-piece is not shown). When a coating material is caused to flow under a predetermined condition from the upstream of a valve 9 while opening the valve 9 and closing a valve 10, the coating fluid is delivered through the flow channel in the inner deckle shaft 5, in the direction of an arrow B from the die with a width defined by the fluid-tight portion 6 near the end of the inner deckle shaft and the deckle 7, and then applied to the surface of a sheet. When the coating width is changed in this case, the right and left inner deckle shafts 5 or one of them is moved by a driving device (not shown). The coating width can easily be changed with the fluid-tight state kept.

Figure 3:
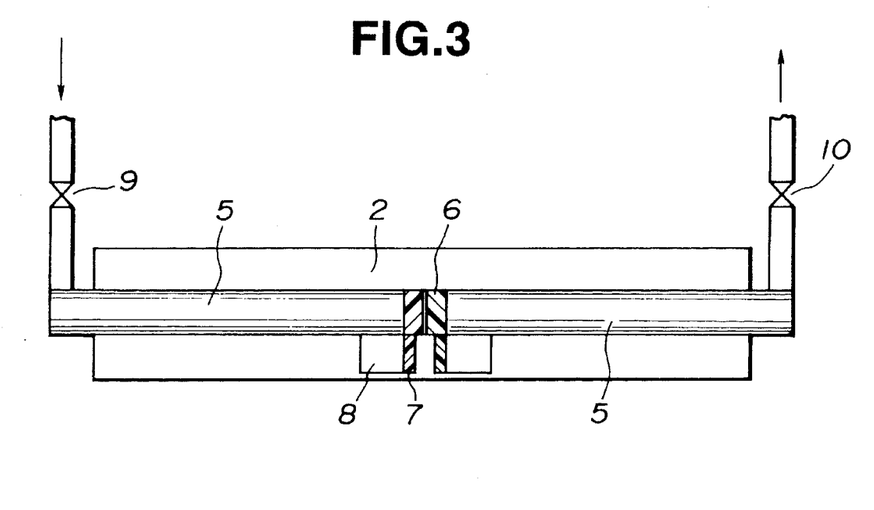
FIG. 3 is a view showing an example of cleaning a coating fluid line.

FIG. 3 is a view showing an example of cleaning a coating fluid line in the die coater according to the present invention. Valves 9 and 10 are opened, the inner deckle shafts 5 are butted against each other around the central portion of the manifold and the cleaning solvent for the line is caused to flow from the upstream of the valve 9. Then, the line can be cleaned without disassembling the die itself.

Figure 4:
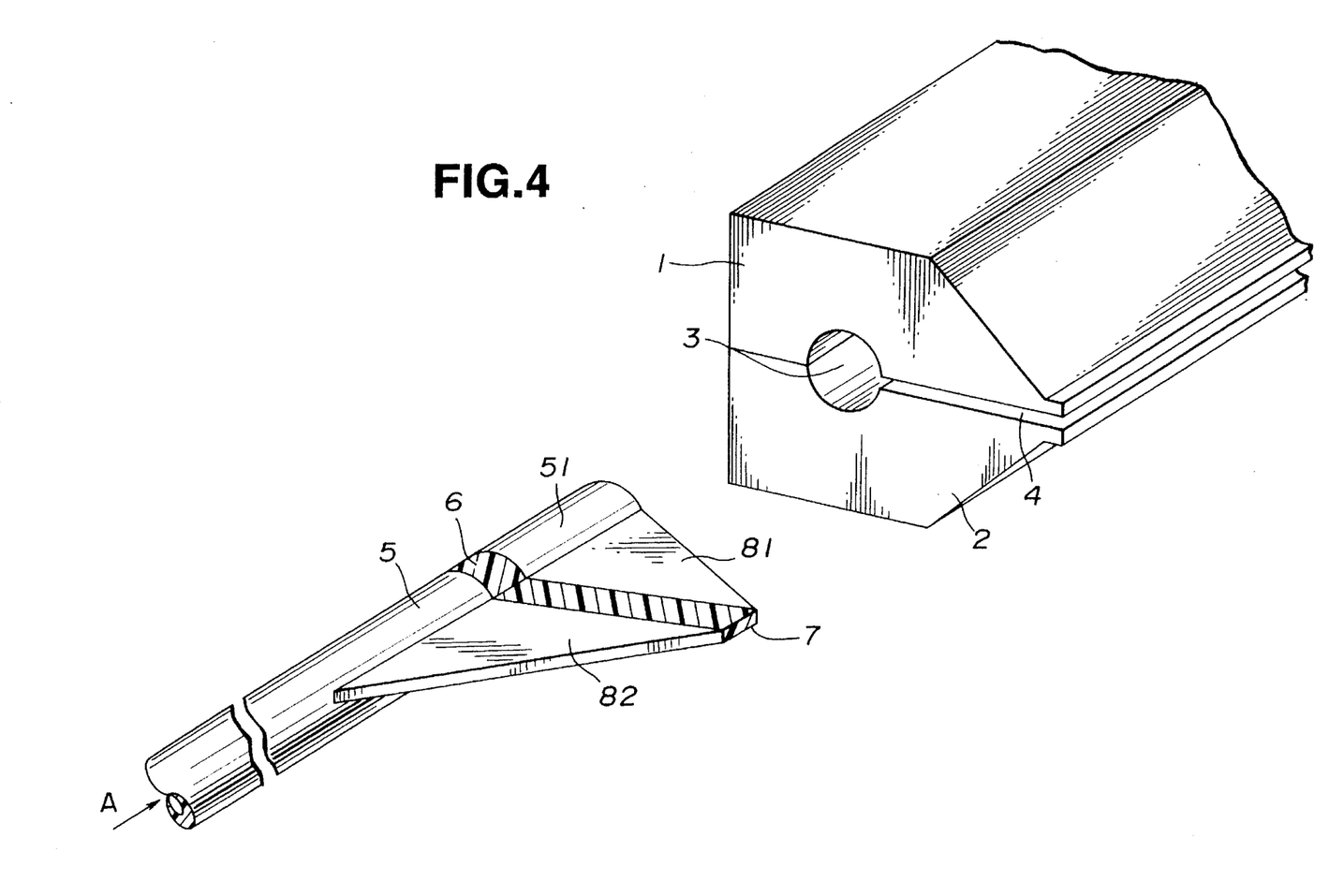
FIG. 4 is an explanatory partial view (perspective view) showing another embodiment of a die coater.

FIG. 4 is an explanatory partial view showing another embodiment of a die coater according to the present invention. This embodiment is different from the inner deckle shaft shown in FIG. 1 in that a front deckle guide 81 and a rear deckle guide 82 are disposed on both sides of the deckle 7, respectively.

Figure 5:
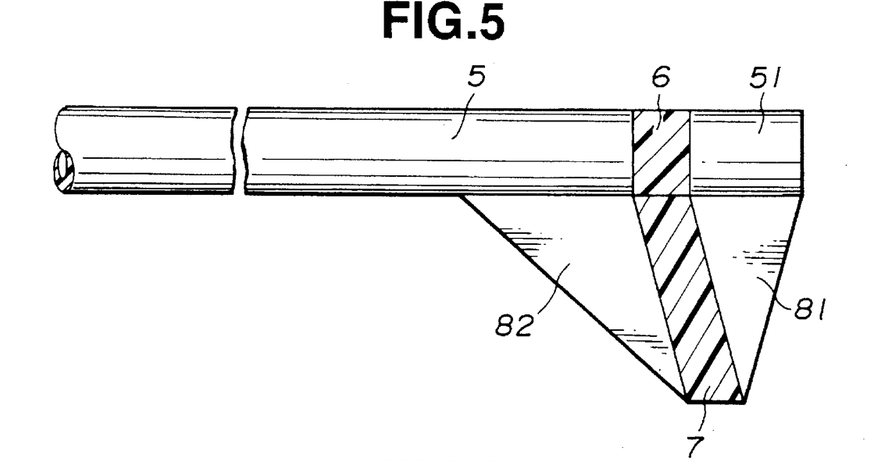
FIG. 5 is an explanatory partial view (top view) of an inner deckle shaft to which a deckle and a deckle guide are secured.

FIG. 5 is an explanatory partial view (top view) of an inner deckle shaft 5 shown in FIG. 4.

Figure 6:
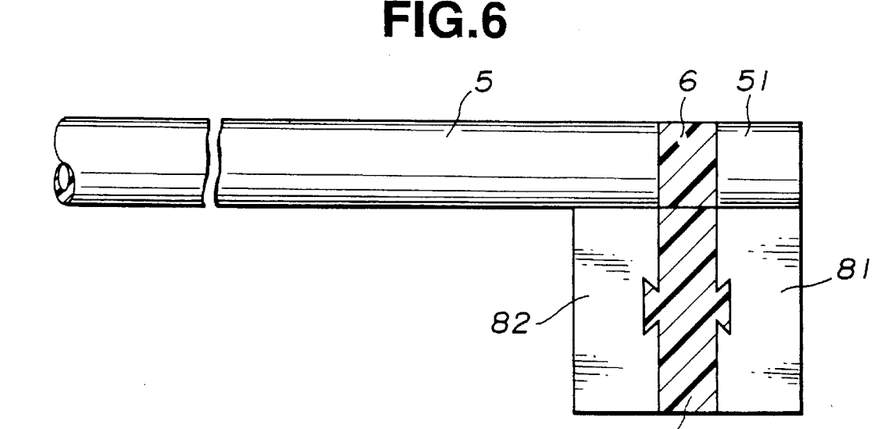
FIG. 6 is an explanatory partial view (top view) showing another embodiment of an inner deckle shaft to which a deckle and a deckle guide are secured.
Figure 7:
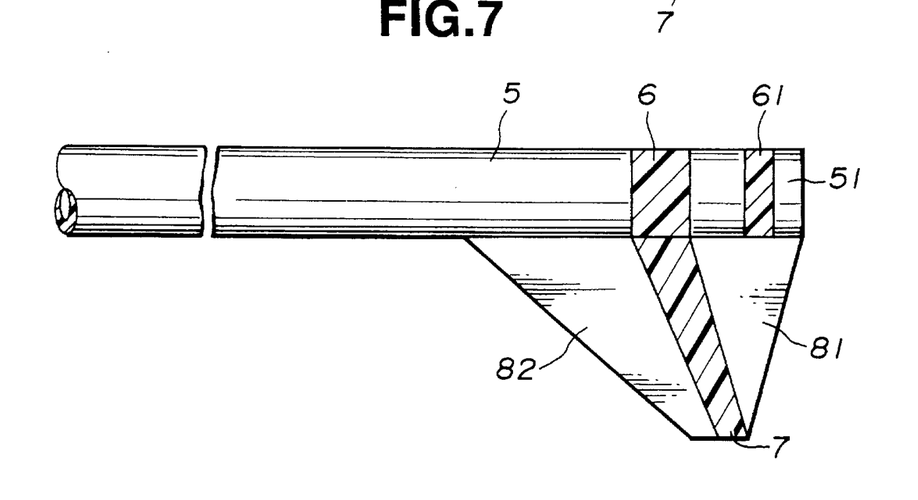
FIG. 7 is an explanatory partial view (top view) showing a further embodiment of an inner deckle shaft to which a deckle and a deckle guide are secured.

FIGS. 6 and 7 are explanatory partial views (top views) showing other different embodiments of the internal deckle shaft. In an inner deckle shaft 5 shown in FIG. 6, two rectangular deckle guides 81, 82 are disposed on both sides of a deckle 7, respectively, and a dove-tail wedge is formed in a connection portion for securing the guide.

FIG. 7 shows a further embodiment in which two fluid-tight portions 6, 61 are disposed near the end of an inner deckle shaft 5 and the deckle is tapered into a trapezoidal shape. This can provide an effect of making the deckle less detachable from the deckle guide upon movement of the inner deckle shaft.

As shown in FIG. 1 and FIGS. 4 to 7, it is necessary that the fluid-tight portion 6 or 61 in the inner deckle shaft 5 and the deckle 7 are connected with each other. With such a structure, free movement of the coating fluid in both of the manifold and the slit can be prevented. If both of them are not connected firmly, fluid leakage may be caused.

Descriptions have been made to the operation of changing the coating width by moving the inner deckle shafts. In the present invention, change of a coating fluid (color change) can be conducted at the same time with the change of the coating width by additionally providing an auxiliary equipment.

The inner deckle shaft usually has a circular cross section like that the cross section of the manifold. In a case where the inner deckle shaft is a hollow (cylindrical) article, the inside can be utilized as a coating fluid supply channel. Further, when a flow channel closing member capable of moving along the manifold is disposed in the flow channel, change of the coating fluid can also be conducted simultaneously. The flow channel closing member provides a fluid-tight state at the outer diametrical periphery thereof in the inside of the inner deckle shaft.

An example of an operation for width change and color change is described with reference to FIGS. 8 to 11.

Figure 8:
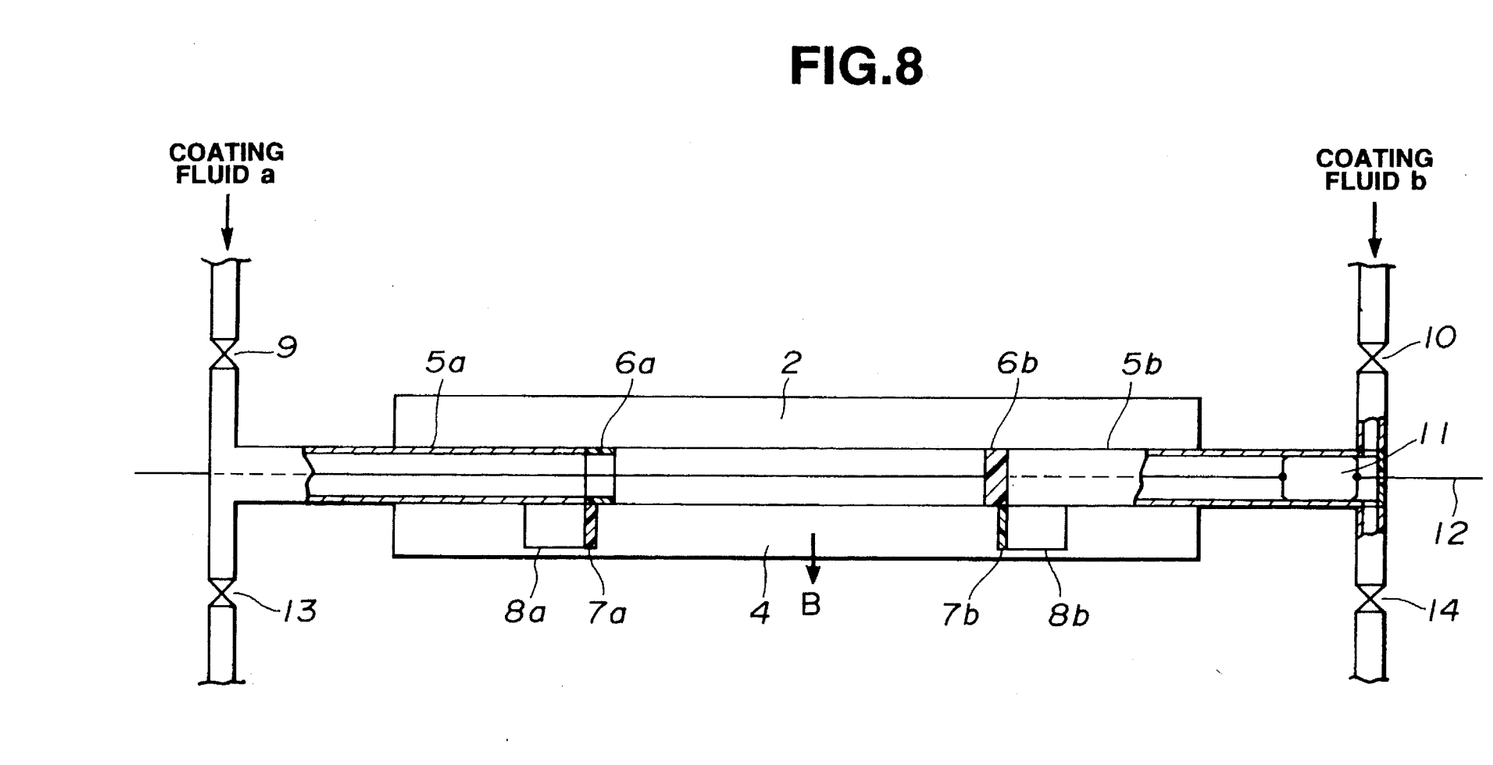
FIG. 8 is a view showing an example of coating operation.

In FIG. 8, valves 9 and 13 connected to an inner deckle shaft 5a are opened and closed respectively, while both of valves 10 and 14 connected to an inner deckle shaft 5b are opened, and a flow channel closing member 11 is situated rightwards in the inner deckle shaft 5b. When a coating fluid a is supplied from the upstream of the valve 9 and a coating fluid b is supplied from the upstream of the valve 10, the coating fluid a is passed through the inner deckle shaft 5a and extruded from the slit 4 to the outside of the die as a thin film along the direction of an arrow B. A portion of the coating fluid a enters the inner deckle shaft 5b but does not intrude into the coating fluid b since fluid-tightness is provided by the flow channel closing member 11. On the other hand, since the inlet of the inner deckle shaft 5b is kept fluid-tight by the flow channel closing member 11, the coating fluid h does not enter the inner deckle shaft 5b but it is sent to the downstream of the valve 14. That is, FIG. 9 shows a state in which two coating fluid supply systems are disposed to one die coater and the coating is operated with the coating solution a, under simultaneous preparation for the coating fluid b (line exchange) in the other system.

Figure 9:
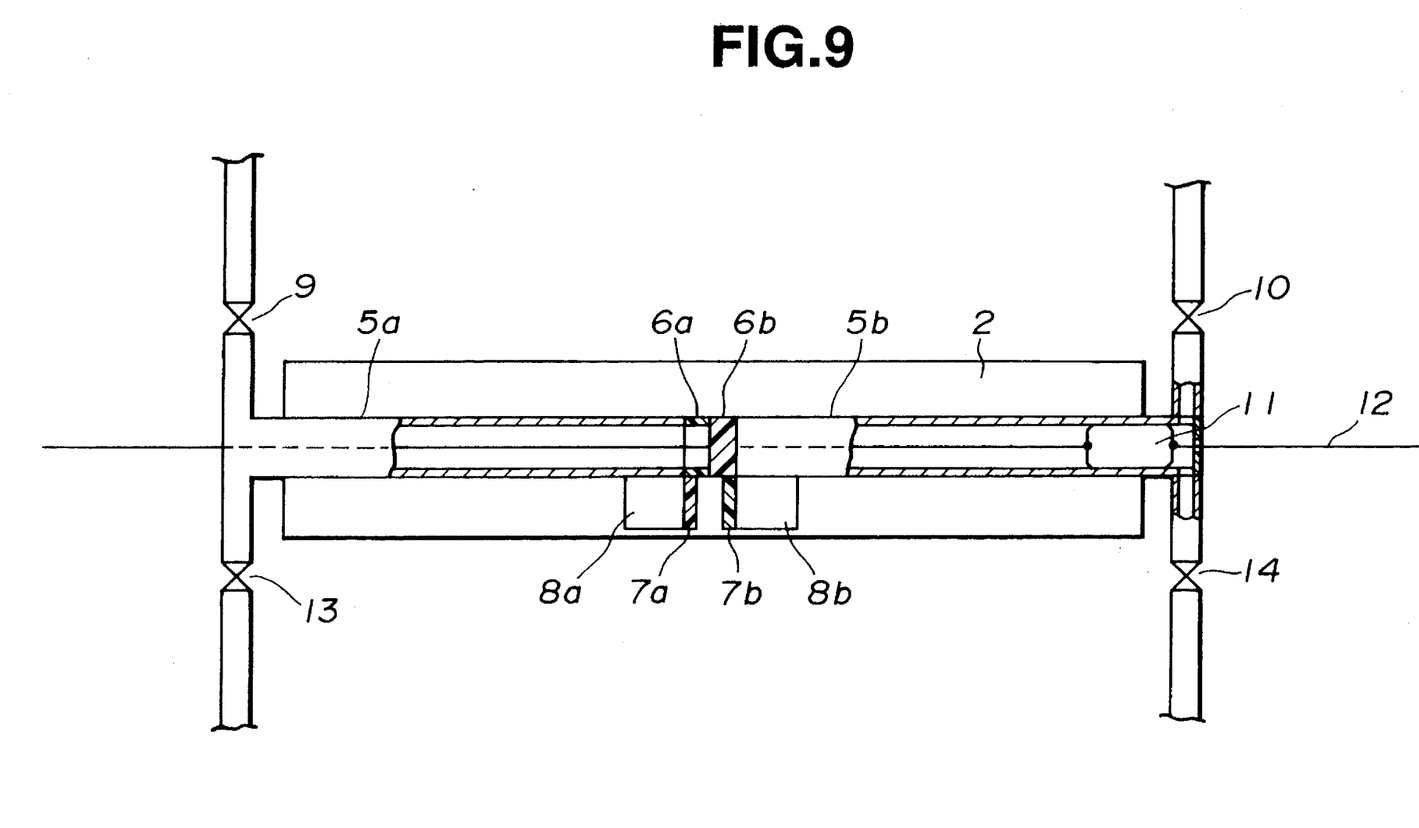
FIG. 9 is a view showing an example of changing a coating width and a coating fluid.
Figure 10:
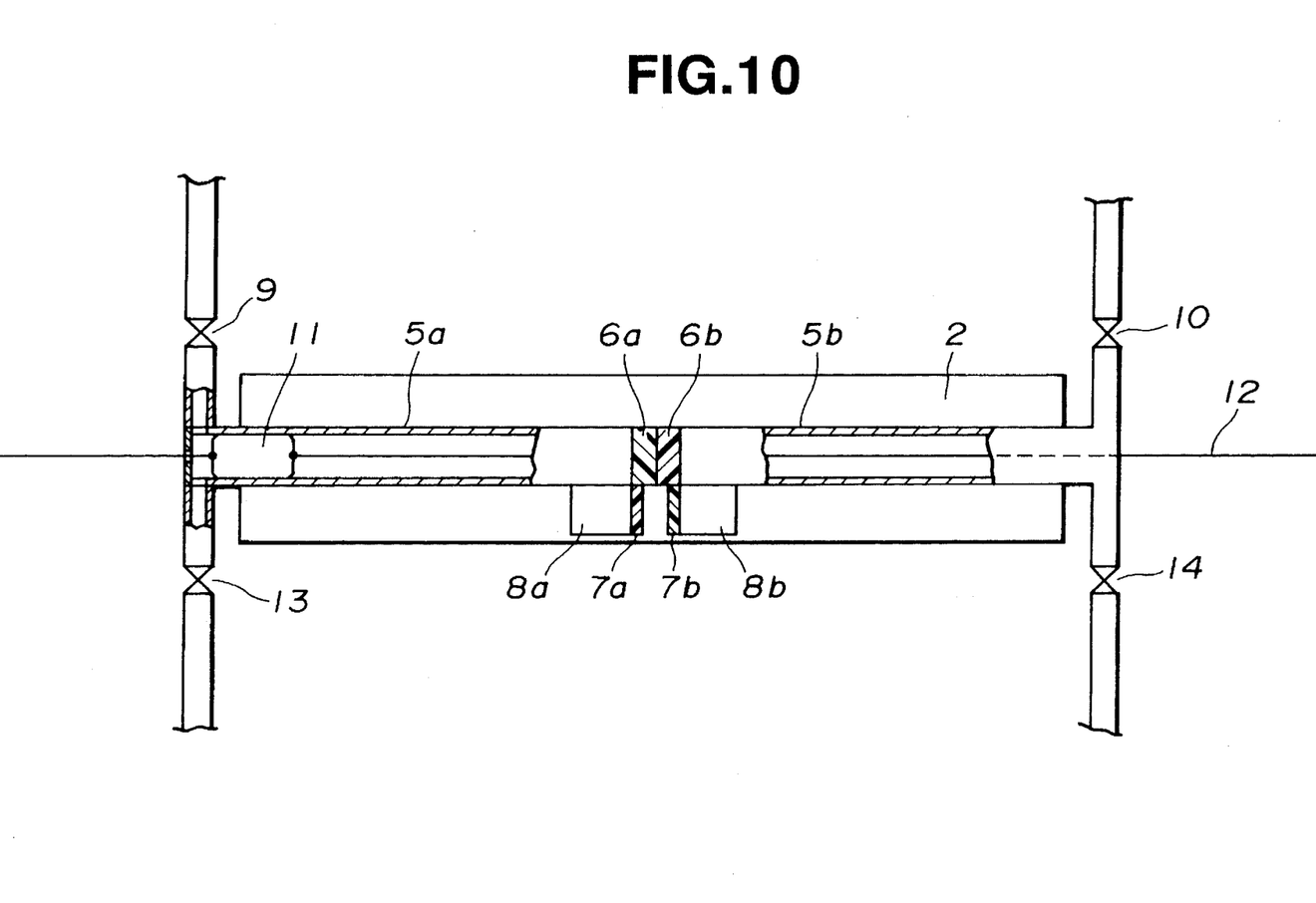
FIG. 10 is a view showing an example of changing a coating width and a coating fluid.
Figure 11:
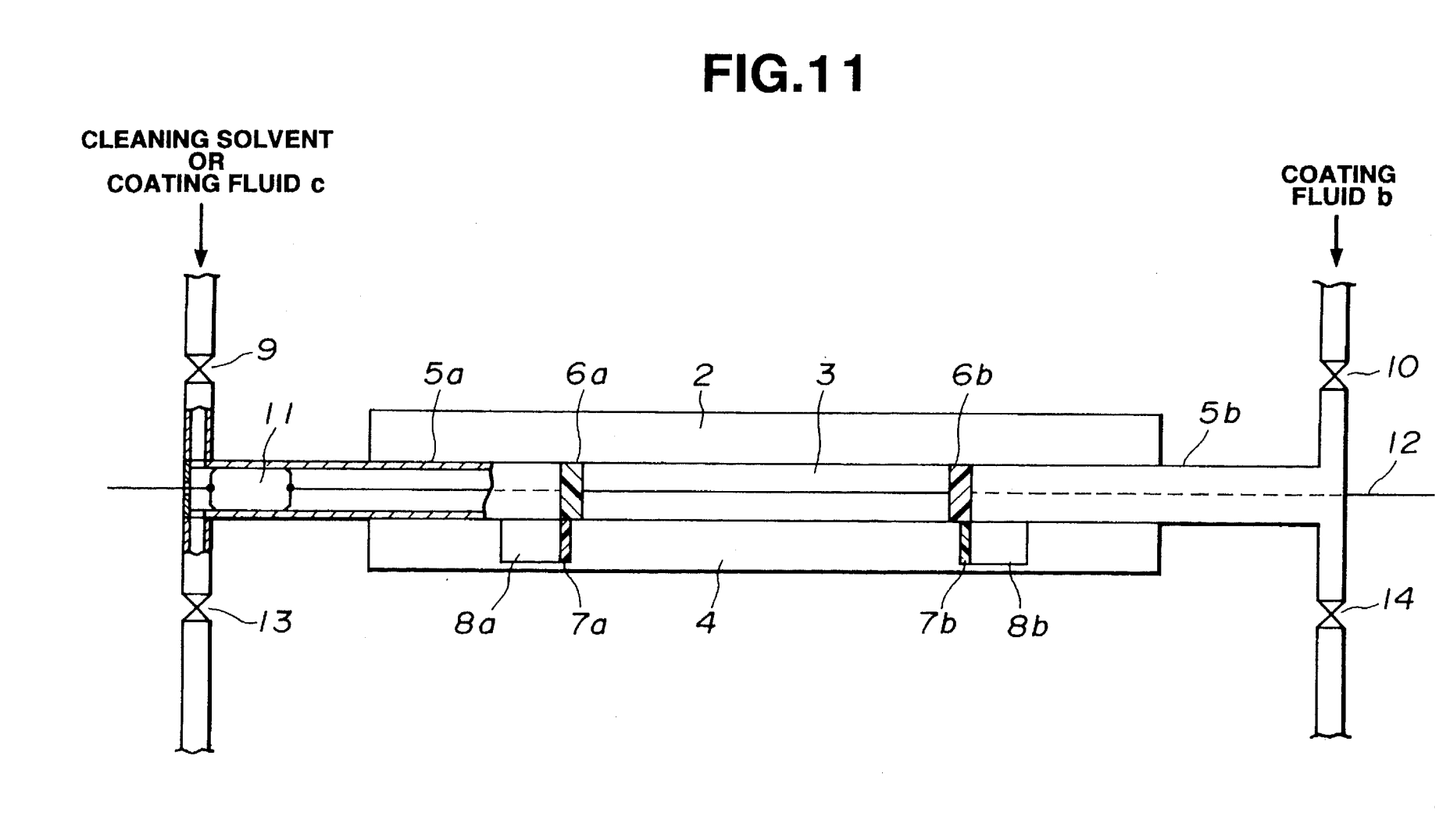
FIG. 11 is a view showing an example of changing a coating width and a coating fluid.

Then, it is described a case of switching the coating fluid a into the coating fluid h and changing the coating width with reference to FIGS. 9 to 11. At first, as shown in FIG. 9, ends of inner deckle shafts (5a, 5b) are brought into contact to each other by a driving device (not shown). In this case, a valve 9 is closed to stop the supply of the coating fluid a.

Then as shown in FIG. 10, a pulling string 12 is pulled by a driving device (not shown) to move a flow channel closing member 11 leftwards in the inner deckle shaft 5a. In this case, a valve 13 is opened and a valve 14 is closed, by which the coating fluid a staying in the inner deckle shaft (5a, 5b) is driven out by the flow channel closing member 11 to reach the downstream of the valve 13, while the coating fluid b is supplied into the inner deckle shafts (5a, 5b).

Then, as shown in FIG. 11, the inner deckle shafts (5a, 5b) are moved so as to form a desired coating width by a driving device (not shown), by which the switching to the coating fluid b is completed. Subsequently, the valve 9 is opened to supply a cleaning solvent from the upstream of the valve 9 and then a coating fluid c is supplied, by which cleaning for the line in the side of the inner deckle shaft 5a and replacement with the succeeding coating fluid can be attained.

The pulling string shown in FIGS. 8 to 11 is made of a material having corrosion resistance to the coating fluid or cleaning fluid. For instance, monofilaments of polyester or polyamide are suitable. The flow channel closing member 11 may be of any shape so long as it can prevent coating or cleaning fluids from mingling each other, and it can scrape off the coating fluid deposited to the inner surface of the inner deckle shaft 5. There can be mentioned, for example, a spherical, ellipsoidal or cylindrical shape. In addition, the flow channel closing member 11 is preferably made of a material having corrosion resistance to the coating fluid or the cleaning fluid, softness and mechanical strength. There can be mentioned, for example, fluoro resin, polyester and polyamide.

In the die coater of the present invention, the coating width can be changed by closing one side of the manifold 3 with a side plate and disposing the inner deckle shaft 5 only to the other side thereof. In this case, since the coating center changes along with the change of the coating width, it is necessary to properly change the feeding position of a coated material.

In a case in which inner deckle shafts 5 are disposed symmetrically in the manifold 3 and moved symmetrically in the same manner, the coating width can be changed advantageously without changing the coating center.

According to the present invention, the coating width can be changed easily without disassembling the die. In particular, when the inner deckle shafts are disposed symmetrically in the manifold, the coating width can be changed as desired, without changing the center position of the coating width.

Further, when the inner deckle shaft is a hollow article, a coating fluid supply channel is the inside thereof and the flow channel closing member capable of rightward and leftward movement is disposed in the channel, the coating fluid can be changed simultaneously with the change of coating width, which provides a significant industrial value.

What is claimed is:

1. A die coater for coating a surface of a sheet, comprising a die having upper and lower mold-pieces which form a manifold and a slit having a slit gap, said slit extending from the manifold, an inner deckle shaft disposed in the manifold, a deckle disposed in the slit in a fluid-tight state, and a deckle guide; the inner deckle shaft having a fluid-tight portion near an end thereof and capable of moving with a fluid-tight state maintained between an outer portion of said fluid-tight portion and an inner portion of said manifold, the deckle and the deckle guide being secured to the inner deckle shaft, and the deckle being connected with the fluid-tight portion of the inner deckle shaft, the inner deckle shaft being a hollow article, and an inside of the inner deckle shaft being connected to a supply of a coating fluid so as to serve as a coating fluid supply channel whereby said die coater applies a width of the coating fluid to the surface of the sheet.

2. A die coater according to claim 1, wherein the die coater includes two deckle guides, and the two deckle guides are disposed on both sides of the deckle.

3. A die coater according to claim 1, wherein the deckle guide has a triangle planar shape.

4. A die coater according to claim 1, wherein the deckle is tapered toward a die-opening end of the slit.

5. A die coater according to claim 1, wherein a plurality of partitioned fluid-tight portions are formed near the end of the inner deckle shaft.

6. A die coater according to claim 1, wherein the die coater includes two inner deckle shafts, and the two inner deckle shafts are symmetrically disposed in the manifold.

7. A die coater according to claim 1, wherein a flow channel closing member capable of moving along the manifold is disposed inside the inner deckle shaft and wherein said deckle is composed of an elastic material and has a thickness greater by 10 to 50 μm than that of the slit gap, and further wherein said deckle is inserted under compression into the slit in a fluid-tight state.

8. A die coater according to claim 1, wherein the deckle guide has a thickness of 10 to 100 μm smaller than said slit gap such that said deckle guide is in a non-fluid tight state with respect to said slit.

* * * * *